(12) United States Patent
Huber et al.

(10) Patent No.: US 10,680,478 B2
(45) Date of Patent: Jun. 9, 2020

(54) ELECTRICAL MACHINE AND VEHICLE EQUIPPED WITH THE ELECTRICAL MACHINE

(71) Applicant: Bayerische Motoren Werke Aktiengesellschaft, Munich (DE)

(72) Inventors: Andreas Huber, Schoenberg (DE); Zakaria El Khawly, Munich (DE); Endre Barti, Munich (DE); Anastasios Vichos, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/202,277

(22) Filed: Nov. 28, 2018

(65) Prior Publication Data

US 2019/0097482 A1 Mar. 28, 2019

Related U.S. Application Data

(63) Continuation of application No. PCT/EP2017/069494, filed on Aug. 2, 2017.

(30) Foreign Application Priority Data

Aug. 17, 2016 (DE) .................. 10 2016 215 423

(51) Int. Cl.
*H02K 1/32* (2006.01)
*H02K 5/20* (2006.01)
(Continued)

(52) U.S. Cl.
CPC ............. *H02K 1/32* (2013.01); *H02K 5/20* (2013.01); *H02K 7/003* (2013.01); *H02K 9/19* (2013.01); *H02K 9/005* (2013.01)

(58) Field of Classification Search
CPC ............. H02K 1/32; H02K 7/003; H02K 1/28; H02K 9/19; H02K 9/193; H02K 5/20; H02K 9/005; H02K 3/24
(Continued)

(56) References Cited

U.S. PATENT DOCUMENTS

| 2003/0030333 A1* | 2/2003 | Johnsen | ................... H02K 1/32 |
|---|---|---|---|
| | | | 310/54 |
| 2005/0057114 A1* | 3/2005 | Calico | ..................... H02K 1/14 |
| | | | 310/257 |

(Continued)

FOREIGN PATENT DOCUMENTS

| AT | 403 864 B | 6/1998 |
|---|---|---|
| CN | 101305510 A | 11/2008 |

(Continued)

OTHER PUBLICATIONS

International Search Report (PCT/ISA/210) issued in PCT Application No. PCT/EP2017/069494 dated Oct. 11, 2017 with English translation (six (6) pages).

(Continued)

*Primary Examiner* — Alfonso Perez Borroto
*Assistant Examiner* — Alexander Moraza
(74) *Attorney, Agent, or Firm* — Crowell & Moring LLP

(57) ABSTRACT

An electrical machine has a rotor with a hollow shaft which in its interior delimits a hollow shaft axial channel that extends in the axial direction and into which a cooling fluid can flow during operation of the electrical machine. A laminated rotor core is fitted radially to the outside of the hollow shaft and has two axial end sides. An axial channel which is delimited by the laminated rotor core extends in the axial direction from one of the two end sides of the laminated rotor core to the other of the two end sides of the laminated rotor core and is connected in a fluid-conducting (Continued)

manner to the hollow shaft axial channel, so that, during operation of the electrical machine, the cooling fluid can flow from the hollow shaft axial channel to the end sides via the axial channel and can flow radially to the outside downstream of the axial channel owing to centrifugal force.

15 Claims, 2 Drawing Sheets

(51) Int. Cl.
  *H02K 7/00* (2006.01)
  *H02K 9/19* (2006.01)
  *H02K 9/00* (2006.01)
(58) Field of Classification Search
  USPC .......................... 310/52, 54, 57–64, 216.123
  See application file for complete search history.

(56) References Cited

U.S. PATENT DOCUMENTS

| | | | |
|---|---|---|---|
| 2009/0261667 A1 | 10/2009 | Matsubara et al. | |
| 2012/0104884 A1 | 5/2012 | Wagner et al. | |
| 2013/0334912 A1* | 12/2013 | Tokunaga | H02K 9/19 310/54 |
| 2014/0300220 A1* | 10/2014 | Marvin | H02K 9/19 310/54 |
| 2015/0137632 A1* | 5/2015 | Takahashi | H02K 1/28 310/54 |
| 2016/0233744 A1 | 8/2016 | Kaneshige et al. | |
| 2016/0322876 A1 | 11/2016 | Horii et al. | |
| 2017/0237318 A1* | 8/2017 | Arndt | H02K 55/04 310/55 |

FOREIGN PATENT DOCUMENTS

| | | |
|---|---|---|
| DE | 81 10 016 U1 | 9/1981 |
| DE | 10 2014 205 017 A1 | 9/2015 |
| EP | 0 688 090 B1 | 5/1997 |
| JP | 2006-67777 A | 3/2006 |
| JP | 2011-97784 A | 5/2011 |
| JP | 2013-115848 A | 6/2013 |
| JP | 2014-155243 A | 8/2014 |
| JP | 2016-59155 A | 4/2016 |
| WO | WO 2010/128632 A1 | 11/2010 |
| WO | WO 2015/107679 A1 | 7/2015 |

OTHER PUBLICATIONS

German-language Written Opinion (PCT/ISA/237) issued in PCT Application No. PCT/EP2017/069494 dated Oct. 11, 2017 (eight (8) pages).

German-language Search Report issued in counterpart German Application No. 102016215423.0 dated Apr. 27, 2018 with partial English translation (10 pages).

Chinese-language Office Action issued in counterpart Chinese Application No. 201780030741.6 dated Dec. 4, 2019 with English translation (18 pages).

* cited by examiner

ELECTRICAL MACHINE AND VEHICLE EQUIPPED WITH THE ELECTRICAL MACHINE

CROSS REFERENCE TO RELATED APPLICATIONS

This application is a continuation of PCT International Application No. PCT/EP2017/069494, filed Aug. 2, 2017, which claims priority under 35 U.S.C. § 119 from German Patent Application No. 10 2016 215 423.0, filed Aug. 17, 2016, the entire disclosures of which are herein expressly incorporated by reference.

BACKGROUND AND SUMMARY OF THE INVENTION

The invention relates to an electrical machine and to a vehicle equipped with the electrical machine.

During operation of an electrical machine, such as a generator or an electric motor for example, heat is released in the electrical machine, wherein the release of heat leads to an increase in the temperature of the electrical machine. As a result, the maximum permissible temperature for the electrical machine leads to limiting of the power which can be delivered by the electrical machine over the long term. Therefore, it is necessary to cool the electrical machine during operation thereof. In so doing, cooling of the rotor of the electrical machine is particularly difficult.

The rotor is conventionally cooled by the rotor being equipped with a shaft of hollow design within which a liquid flows during operation of the electrical machine. However, a disadvantage of this is that there is a long heat-conducting path from the radial outer side of the rotor to the liquid. In addition, the surface which is arranged in the interior of the shaft, which comes into contact with the liquid and via which the heat is transmitted from the rotor to the liquid is small. In addition, in the event of a laminated core being arranged on the shaft, the boundary area between the shaft and the laminated core constitutes thermal resistance to the conduction of heat. As a result, cooling of the rotor with a shaft of a hollow design is disadvantageously ineffective overall.

The object of the invention is therefore to provide an electrical machine and a vehicle equipped with the electrical machine, wherein the electrical machine, in particular the rotor thereof, can be cooled effectively.

The electrical machine according to the invention has a rotor with a hollow shaft which, in its interior, delimits a hollow shaft axial channel which extends in the axial direction and into which a cooling fluid can flow during operation of the electrical machine, a laminated rotor core which is fitted radially on the outside of the hollow shaft and has two axial end sides, and an axial channel which is delimited by the laminated rotor core, extends in the axial direction from one of the two end sides of the laminated rotor core to the other of the two end sides of the laminated rotor core and is connected in a fluid-conducting manner to the hollow shaft axial channel, so that, during operation of the electrical machine, the cooling fluid can flow from the hollow shaft axial channel, via the axial channel, to the end sides and can flow radially to the outside downstream of the axial channel owing to centrifugal force. As a result, the cooling fluid comes into direct contact with the laminated core and can therefore effectively cool said laminated core. In addition, the boundary area between the hollow shaft and the laminated rotor core as a barrier to the conduction of heat to the cooling fluid no longer exists. In addition, it is possible to arrange the axial channel in such a way that the heat-conducting path to the cooling fluid within the rotor is short, as a result of which the cooling is likewise effective. Since the cooling fluid is returned via the laminated core, a return within the shaft is not necessary, and therefore the shaft can be designed to be short in the radial direction.

The electrical machine preferably has a stator which is arranged radially outside the rotor, a laminated stator core which has two axial end sides, and has a winding of electrical conductors, wherein the axial end sides of the laminated stator core are arranged in alignment with the axial end sides of the laminated rotor core and the electrical conductors exit from the laminated stator core at the axial end sides of the laminated stator core and form end windings radially outside the laminated stator core, so that the cooling fluid which can flow radially to the outside downstream of the axial channel can hit the end windings of the stator and therefore can cool said end windings. Therefore, the cooling fluid is used in order to cool both the rotor and also the end windings of the stator.

It is preferred that the axial channel is arranged between the hollow shaft and the laminated rotor core and is delimited by the hollow shaft and the laminated rotor core. Therefore, the cooling fluid which flows in the axial channel during operation can cool both the hollow shaft and also the laminated core. In this case, it is preferred that the hollow shaft and/or the laminated rotor core have a cutout, which cutouts form the axial channel.

As an alternative, it is preferred that the axial channel is delimited by the laminated rotor core on the inside and on the outside in the radial direction. Therefore, the laminated rotor core can be particularly effectively cooled. It is particularly preferred that the axial channel is arranged in the center between the radial inner side and the radial outer side of the laminated rotor core. Therefore, the heat-conducting paths to the axial channel within the laminated rotor core can be minimized.

A plurality of axial channels is preferably provided, which axial channels are arranged in a uniformly distributed manner in the circumferential direction. As a result, the rotor can be cooled in a uniform manner in the circumferential direction, as a result of which particularly hot points in the rotor can be avoided.

It is preferred that the rotor has a radial channel via which the axial channel is connected in a fluid-conducting manner to the hollow shaft axial channel. If the electrical machine has a plurality of axial channels, a respective radial channel can be provided for each of the axial channels, which radial channel connects the respective axial channel in a fluid-conducting manner to the hollow shaft axial channel.

The laminated rotor core usually has a cylindrical inside diameter which is somewhat smaller than the corresponding outside diameter of the rotor shaft. When the laminated core is shrink-fitted onto the rotor shaft, a rotationally fixed mechanical press-fit is established by thermal widening due to heating of the rotor laminate and/or cooling of the shaft. However, very accurate manufacturing tolerances and a slow and expensive furnace process are required for this purpose.

As an alternative, the individual laminates of the laminated rotor core can have a large number of cutouts which are distributed around the inside diameter. This creates a serrated pattern which interrupts the otherwise customary circular hole. In this case, the serrations are advantageously arranged in such a way that a cutout and a serration always come to lie one above the other when the laminates are stacked to form the laminated core. This has the advantage that the serrations of the laminates can yield when said laminated core is mounted on the shaft and, as a result, the laminated core and the rotor shaft can be joined when there are relatively small temperature differences, this simplifying and accelerating the process. In addition, the fluid-carrying axial channels can also be integrated in a simple manner at the same time as when the serrations/cutouts are produced.

It is preferred that the electrical machine has a machine housing which houses the rotor and the stator. As a result, the rotor and the stator can be protected against environmental influences and, in addition, the cooling fluid which exits from the end sides of the laminated rotor core can be captured. In this case, it is preferred that the machine housing has a passage hole which is arranged at the lower end of the machine housing and via which the cooling fluid can exit from the machine housing. Therefore, the cooling fluid which exits from the end sides of the laminated rotor core can be collected and then can flow back into the hollow shaft.

The machine housing preferably has a housing cooling channel through which a further cooling fluid can flow for the purpose of cooling the machine housing; in particular the electrical machine is designed for a mixture containing water and glycol to flow through the housing cooling channel.

Therefore, the cooling fluid which exits from the end sides of the laminated rotor core can be cooled and can therefore already once again be suitable to flow into the hollow shaft for the purpose of renewed cooling of the electrical machine.

It is preferred that the cooling fluid is electrically non-conductive. Therefore, the end windings themselves can then be cooled using the cooling fluid if the electrical conductors of the end windings are not electrically insulated. The cooling fluid is preferably an oil, in particular a transmission oil.

The electrical machine is preferably an electric motor, in particular for a vehicle.

The vehicle according to the invention has the electrical machine according to the invention, wherein the vehicle has a conveying device which is designed for the cooling fluid to flow into the hollow shaft, wherein the conveying device is designed, in particular, to convey a transmission oil of the vehicle.

Other objects, advantages and novel features of the present invention will become apparent from the following detailed description of one or more preferred embodiments when considered in conjunction with the accompanying drawing.

DETAILED DESCRIPTION OF THE DRAWINGS

Figure 1:
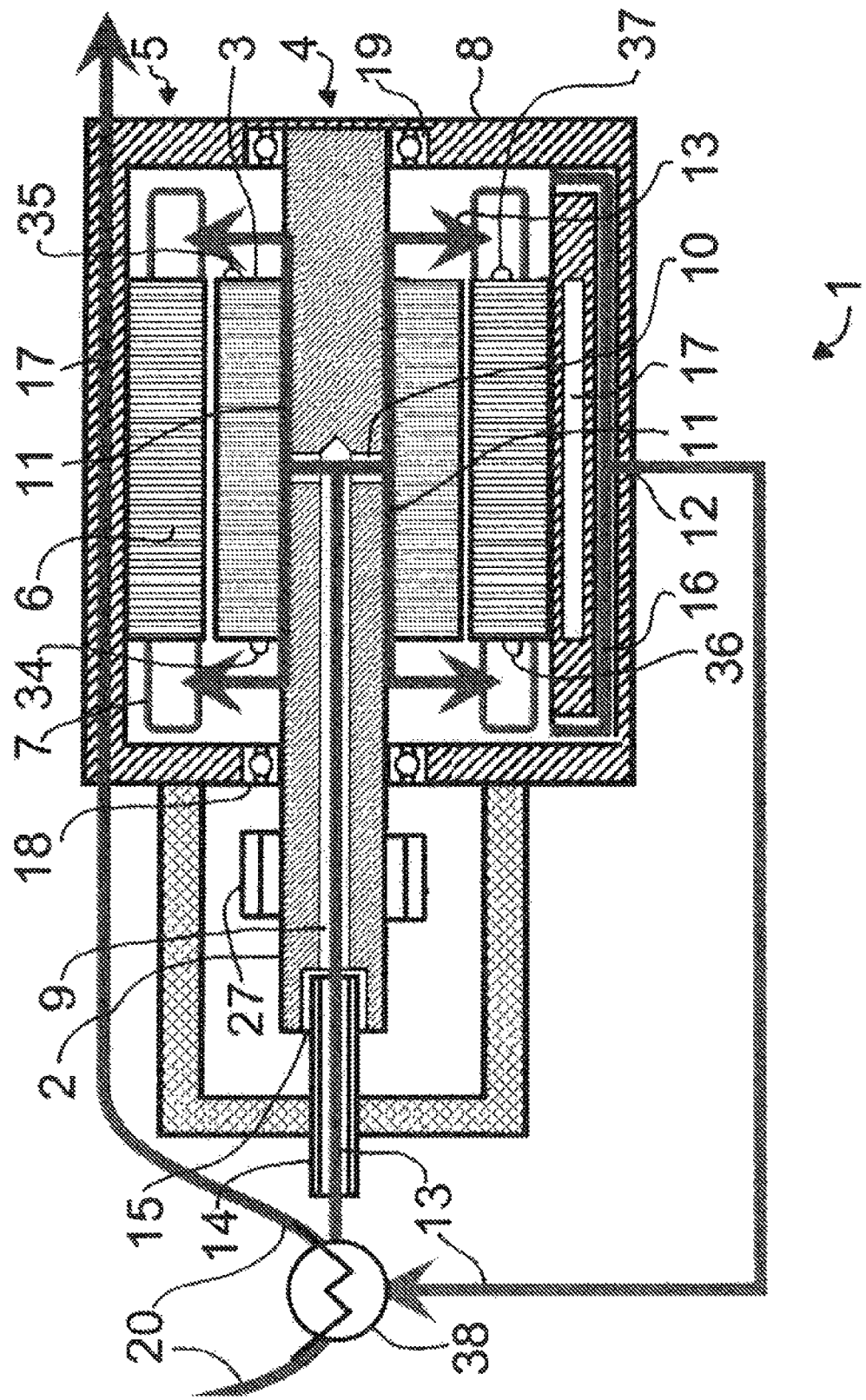
FIG. 1 is a longitudinal section view through an electrical machine according to an embodiment of the invention.

As is shown in FIG. 1, an electrical machine 1, for example an electric motor for a vehicle, has a rotor 4, which can rotate during operation of the electrical machine 1, and a stationary stator 5. The rotor 4 has a hollow shaft 2. A hollow shaft axial channel 9, which is arranged in the interior of the hollow shaft 2, extends in the axial direction and is delimited by the hollow shaft 2. A cooling fluid can flow into the axial channel 9 during operation of the electrical machine 1. The cooling fluid can be electrically non-conductive. By way of example, the cooling fluid can be an oil and, in particular, if the electrical machine is installed in a vehicle, a transmission oil. Furthermore, the rotor 4 has a laminated rotor core 3 which is fitted radially on the outside of the hollow shaft 2. The rotor 4 has permanent magnets and/or electrical conductors for generating a magnetic field, which permanent magnets and/or electrical conductors are introduced into the laminated rotor core 3. The laminated rotor core 3 has a first axial end side 34 and a second axial end side 35, which axial end sides are outer ends of the laminated rotor core 3 in the axial direction. It is contemplated that the laminated rotor core 3 has end plates at its outer ends. In this case, the axial end sides are the ends of the end plates situated on the outside. In addition, it is contemplated that rotor end windings or short-circuiting rings are arranged at the axial end sides 34, 35.

Furthermore, the rotor 4 has an axial channel 11 which is delimited by the laminated rotor core 3, extends in the axial direction from one of the two end sides 34 of the laminated rotor core 3 to the other of the two end sides 35 of the laminated rotor core 3, and is connected in a fluid-conducting manner to the hollow shaft axial channel 9. During operation of the electrical machine 1, the cooling fluid can flow from the hollow shaft axial channel 9, via the axial channel 11, to the two end sides 34, 35, and can flow radially to the outside downstream of the axial channel 11 owing to centrifugal force.

In order for the cooling fluid to flow into the hollow shaft axial channel 9, the electrical machine 1 has a stationary tube 14 which is arranged coaxially with the hollow shaft 2 and is arranged with a longitudinal end of the tube 14 in a longitudinal end of the hollow shaft 2, so that the cooling fluid can flow into the hollow shaft axial channel 9 via the tube 14. In order to seal off the annular gap between the tube 14 and the hollow shaft 2, a gap seal 15 is arranged between the radial outer side of the tube 14 and the radial inner side of the hollow shaft 2. The inside diameter of the tube 14 can be equal to the diameter of the hollow shaft axial channel 9, so that the cooling fluid can enter the hollow shaft axial channel 9 from the tube 14 as freely as possible and therefore with as little flow resistance as possible.

As shown in FIG. 1, the rotor 4 has two axial channels 11 which are arranged opposite one another in the circumferential direction. In this case, any desired other number of axial channels 11 is also possible, wherein the axial channels are arranged preferably in a uniformly distributed manner in the circumferential direction. The hollow shaft axial channel 9 extends substantially from one longitudinal end of the hollow shaft 2 to the axial center of the laminated rotor core 3. A radial channel 10 extends from the axial center of the laminated rotor core 3 for each of the axial channels 11, the respective axial channel 11 being connected in a fluid-conducting manner to the hollow shaft axial channel 9 via said radial channel 10. It is contemplated that the laminated rotor core 3 has a plurality of projections, in particular serrations, which protrude from the radial inner side of the laminated rotor core 3, and the hollow shaft 2 has a plurality of cutouts which are introduced into the radial outer side of the hollow shaft 2, wherein the projections engage into the cutouts and at least one of the radial channels 10 extends within one of the projections. The projections can be arranged in an offset manner in successive laminates of the laminated rotor core 3. The assembly process for the rotor 4 can be simplified in this way.

Figure 2:
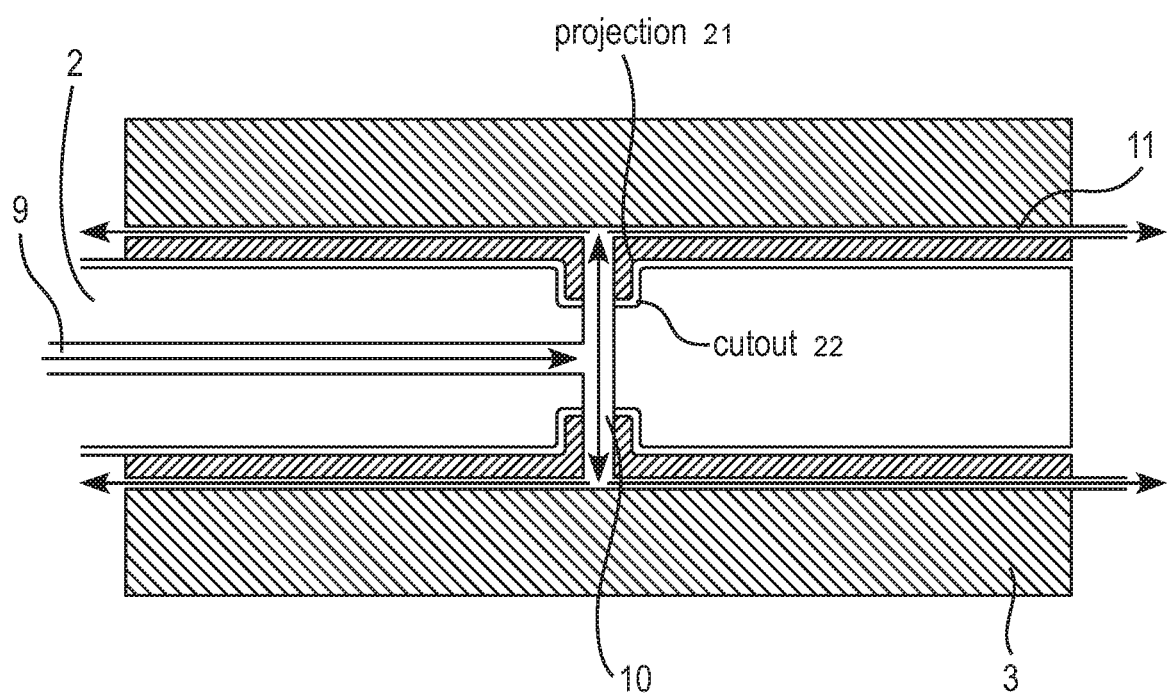
FIG. 2 illustrates an exemplary embodiment of a laminated rotor core that includes at least one projection and at least one cutout according to the present invention.

FIG. 2 illustrates an exemplary embodiment of a laminated rotor core that includes at least one projection and at least one cutout according to the present invention. The at least one projection 21 protrudes from a radial inner surface of the laminated rotor core 3. The hollow shaft 2 has at least one cutout 22 in a radial outer surface of the hollow shaft 2, wherein the at least one projection 21 engages the at least one cutout 22 and the radial channel 10 extends within the at least one projection 21.

The axial channel 11 according to the FIGURE is arranged between the hollow shaft 2 and the laminated rotor core 3 and is delimited by the hollow shaft 2 radially on the inside and by the laminated rotor core 3 radially on the outside. To this end, according to FIG. 1, the laminated rotor core 3 has a cutout on its radial inner side 3, which cutout forms the axial channel 11. In addition or as an alternative, the hollow shaft 2 may have a cutout on its radial outer side, which cutout forms the axial channel 11.

As an alternative, the axial channel 11 can also be arranged in such a way that it is delimited by the laminated rotor core 3 on the inside and on the outside in the radial direction, which means that it is delimited by the laminated rotor core 3 over its entire circumference. In particular, the axial channel 11 can be arranged substantially in the center between the radial inner side of the laminated rotor core 3 and the radial outer side of the laminated rotor core 3.

FIG. 1 shows that the electrical machine 1 has a stator 5 which is arranged radially outside the rotor 4. The stator 5 has a laminated stator core 6. The laminated stator core 6 has a first axial end side 36 and a second axial end side 37, which axial end sides are the outer ends of the laminated stator core 6 in the axial direction. In this case, the first axial end side 36 of the laminated stator core 6 is arranged in the same axial position as, and in alignment with, the first axial end side 34 of the laminated rotor core 3. The second axial end side 37 of the laminated stator core 6 is arranged in the same axial position as, and in alignment with, the second axial end side 35 of the laminated rotor core 3. Furthermore, the stator 5 has a winding of electrical conductors which exit from the laminated stator core 6 at the axial end sides 36, 37 of the laminated stator core 6 and form end windings 7 axially outside the laminated stator core 6. Therefore, during operation of the electrical machine 1, the cooling fluid which can flow radially to the outside downstream of the axial channel 11 hits the end windings 7 and therefore cools said end windings.

As shown in FIG. 1, the electrical machine 1 has a machine housing 8 which houses the rotor 4 and the stator 5 and, additionally, is designed to capture the cooling fluid downstream of its outlet from the axial end sides 34, 35 of the laminated rotor core 3. In order to supply the cooling fluid which is collected by the machine housing 8, the machine housing 8 has a passage hole 12 which is arranged at the lower end of the machine housing 8 and via which the cooling fluid can exit from the machine housing 8. In addition, the machine housing 8 is fitted with a first bearing 18 and a second bearing 19, which bearings support the hollow shaft 2 in a rotatable manner in two different axial positions.

Furthermore, the machine housing 8 has a housing cooling channel 17 through which a further cooling fluid can flow for the purpose of cooling the machine housing 8. By way of example, the electrical machine 1 can be designed for a mixture containing water and glycol to flow through the housing cooling channel 17 as the cooling fluid during operation of said electrical machine.

The circulation of the cooling fluid stream 13 of the cooling fluid takes place during operation of the electrical machine 1 as follows: after entering the tube 14, the cooling fluid flows into the hollow shaft axial channel 9 and then, via the radial channel 10, into the axial channel 11. The cooling fluid stream 13 splits up in the axial channel 11 in order to flow to the first axial end side 34 and to the second axial end side 35 of the laminated rotor core 3. There, the cooling fluid exits from the axial channel 11, is transported radially to the outside owing to the centrifugal forces which exist during operation of the electrical machine 1, and there impacts the end windings 7. The cooling fluid then collects at the bottom of the machine housing 8 owing to the force of gravity. A plurality of holes is provided at the bottom of the machine housing 8, said holes being connected to the passage hole 12 via a drain channel 16. In order to discharge the cooling fluid from the machine housing 8 via the passage hole and for said cooling fluid to flow into the tube 14, a conveying device can be arranged downstream of the passage hole 12 and upstream of the tube 14. The conveying device can be designed to convey the transmission oil particularly if the electrical machine is installed in a vehicle. In order to cool the cooling fluid before it enters the tube 14, a heat exchanger 38 is provided downstream of the passage hole 12 and upstream of the tube 14. The heat exchanger 38 can be cooled using the further cooling fluid, as illustrated in the FIGURE. In this case, the cooling fluid flow 20 of the further cooling fluid is such that the cooling fluid initially flows through the heat exchanger 38 and then through the machine housing 8.

LIST OF REFERENCE SYMBOLS

1 Electrical machine
2 Hollow shaft
3 Laminated rotor core
4 Rotor
5 Stator
6 Laminated stator core
7 End winding
8 Machine housing
9 Hollow shaft axial channel
10 Radial channel
11 Axial channel
12 Passage hole
13 Cooling fluid stream
14 Tube
15 Gap seal
16 Drain channel
17 Housing cooling channel
18 First bearing
19 Second bearing
20 Cooling fluid flow of the further cooling fluid
27 Gear
34 First end side of the laminated rotor core
35 Second end side of the laminated rotor core
36 First end side of the laminated stator core
37 Second end side of the laminated stator core
38 Heat exchanger The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical machine, comprising:
a rotor which comprises
(i) a hollow shaft which, in an interior thereof, delimits a hollow shaft axial channel which extends n an axial direction and into which a cooling fluid flows during operation of the electrical machine;
(ii) a laminated rotor core which is fitted radially on an outside of the hollow shaft and has two axial end sides, and
(iii) an axial channel which is delimited by the laminated rotor core, extends in the axial direction from one of the two axial end sides of the laminated rotor core to the other of the two axial end sides of the laminated rotor core and is connected in a fluid-conducting manner to the hollow shaft axial channel, wherein
the rotor is configured such that, during operation of the electrical machine, the cooling fluid flows from the hollow shaft axial channel, via the axial channel, to the two axial end sides, and flows radially to the outside downstream of the axial channel owing to centrifugal force,
wherein the rotor has a radial channel via which the axial channel is connected in a fluid-conducting manner to the hollow shaft axial channel,
the laminated rotor core has at least one projection which protrudes from a radial inner surface of the laminated rotor core, and
the hollow shaft has at least one cutout in a radial outer surface of the hollow shaft, wherein the at least one projection engages the at least one cutout and the radial channel extends within the at least one projection.

2. The electrical machine as claimed in claim 1, further comprising:
a stator which is arranged radially outside the rotor, the stator having a laminated stator core which has two axial end sides, and a winding of electrical conductors, wherein
the axial end sides of the laminated stator core are arranged in alignment with the axial end sides of the laminated rotor core, and
the windings of the electrical conductors exit from the laminated stator core at the axial end sides to form end windings axially outside the laminated stator core, so that the cooling fluid which flows radially to the outside downstream of the axial channel impacts the end windings of the stator and cools said end windings.

3. The electrical machine as claimed in claim 1, wherein the axial channel is arranged between the hollow shaft and the laminated rotor core and is delimited by the hollow shaft and the laminated rotor core.

4. The electrical machine as claimed in claim 3, wherein the hollow shaft and/or the laminated rotor core have a cutout, which cutout forms the axial channel.

5. The electrical machine as claimed in claim 1, wherein the axial channel is delimited by the laminated rotor core on the inside and on the outside in the radial direction.

6. The electrical machine as claimed in claim 1, wherein the cooling fluid is electrically non-conductive.

7. The electrical machine as claimed in claim 6, wherein the cooling fluid is an oil.

8. The electrical machine as claimed in claim 1, wherein a plurality of axial channels is provided, which axial channels are arranged in a uniformly distributed manner in a circumferential direction.

9. The electrical machine as claimed in claim 1, further comprising:
a machine housing which houses the rotor and the stator.

10. The electrical machine as claimed in claim 9, wherein the machine housing has a passage hole which is arranged at a lower end of the machine housing and via which the cooling fluid exits from the machine housing.

11. The electrical machine as claimed in claim 9, wherein the machine housing has a housing cooling channel through which a further cooling fluid flows for cooling the machine housing.

12. The electrical machine as claimed in claim 11, wherein
the further cooling fluid is a mixture containing water and glycol.

13. The electrical machine as claimed in claim 7, wherein the oil is a transmission oil.

14. The electrical machine as claimed in claim 1, wherein the electrical machine is an electric motor for a vehicle.

15. A vehicle, comprising:
an electrical machine as claimed in claim 1; and
a conveying device configured to convey the cooling fluid that flows into the hollow shaft, wherein
the conveying device conveys a transmission oil of the vehicle as the cooling fluid.

* * * * *